(No Model.)
E. P. COLLINS.
WARP BEAM.
No. 356,823. Patented Feb. 1, 1887.
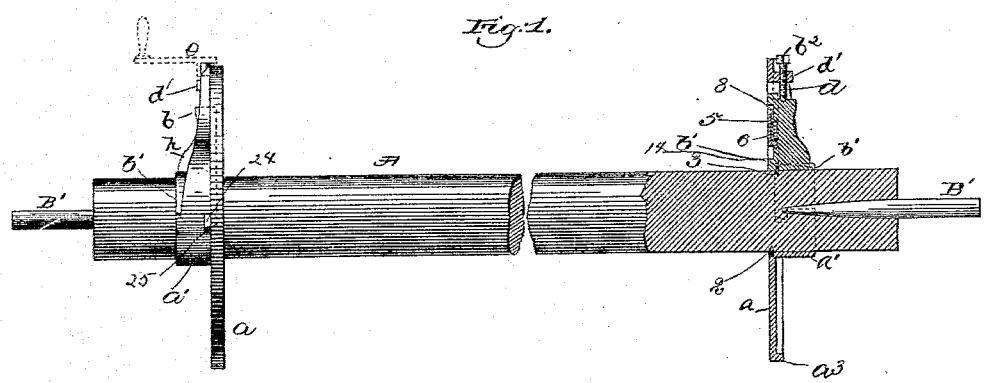
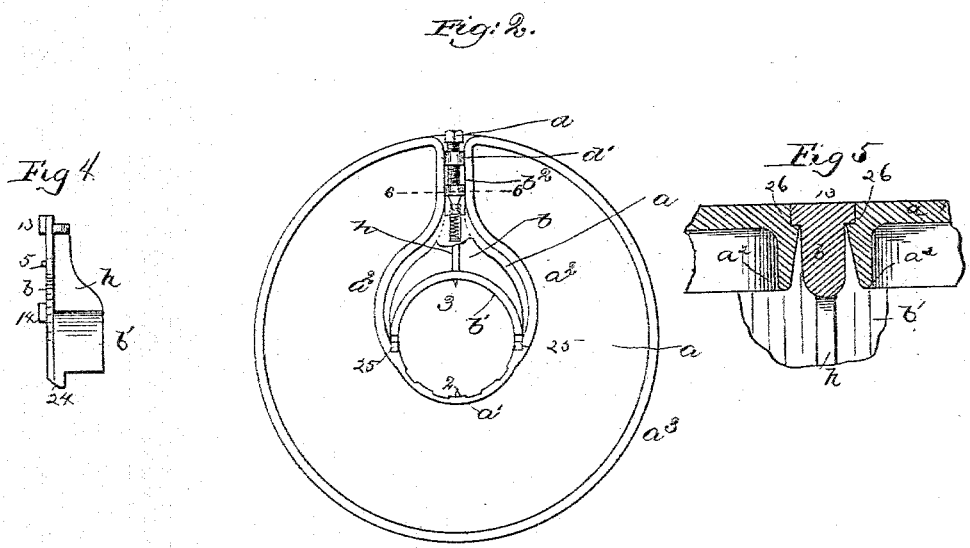
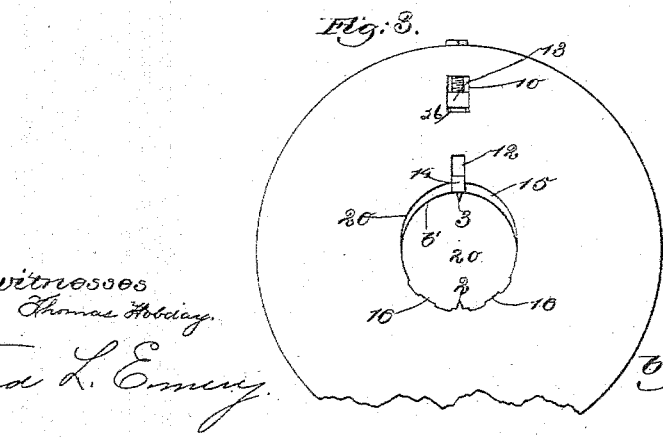

UNITED STATES PATENT OFFICE.

ELIHU P. COLLINS, OF LAWRENCE, MASSACHUSETTS.

WARP-BEAM.

SPECIFICATION forming part of Letters Patent No. 356,823, dated February 1, 1887.

Application filed July 12, 1886. Serial No. 207,837. (No model.)

*To all whom it may concern:*

Be it known that I, ELIHU P. COLLINS, of Lawrence, county of Essex, and State of Massachusetts, have invented an Improvement in Warp-Beams, of which the following description, in connection with the accompanying drawings, is a specification, like letters on the drawings representing like parts.

This invention has for its object to simplify and cheapen the construction of warp-beams used in looms and other machinery wherein warp is handled upon beams.

Ordinarily the heads of such beams, provided at their centers with annular flanges to form hubs to embrace the beam, are attached thereto by screws and wedges, the screws passing through holes in the hubs, the wedges being driven into the space between the hubs and beam.

In accordance with my invention, instead of employing a head having an open annular hub, I have provided a head having a divided or separable segmental hub, in order that one part of the hub—preferably, substantially one half of it—may be moved away from the other half, the said movement being preferably accomplished by means of a screw or equivalent adjusting device.

In accordance with my invention, the two segmental parts of the hub may be simultaneously clamped upon the beam in any desired adjusted position, or may be separated to be adjusted upon the beam, and preferably one or both the segmental sections constituting the hub will have one or more points or projections to enter the beam, and thereby prevent longitudinal movement of the head upon or with relation to the beam; but I wish it to be understood that these points may be omitted.

I have also shown the divided hub as provided with short concaved bearings to aid in the adjustment of the head to inequalities of surface of the beam, and so also I have shown the head as provided with an elongated opening, the end of the said opening opposite the rigid segmental hub made a fixed part of the head being of a different arc than the fixed part of the hub or of the movable part of the hub attached to the radially-movable plate to be described, such enlarged or elongated opening, when the segmental hubs are separated, affording space for the movement of the heads on the beam. To keep the warp-threads from entering this space I have provided the radially-movable plate with a projection to span or bridge it when the head is clamped to the beam.

Figure 1, in elevation and section, shows a warp-beam with my invention applied thereto. Fig. 2 is an outside elevation of the head and slide-plate, the central rib of the slide-plate being broken out to show the spring behind it. Fig. 3 is an inner side view of one of the heads removed. Fig. 4 is a side elevation of the sliding plate and its attached segmental hub removed from the head; and Fig. 5 is a section of Fig. 2 in the dotted line 6 6, but enlarged chiefly to show the means for preventing the movement of the outer end of the sliding plate laterally from between the ribs between which it slides.

The beam A, upon which will be wound the yarn or thread, may be of any usual size, length, and material, it being provided with journals B′, driven therein, the said journals being either short rods, as shown in Fig. 1, or of other usual construction.

My improved warp-beam head is composed of a disk, $a$, provided at its center with an elongated or somewhat oval opening, as 20, the head having an attached segmental or semi-cylindrical hub, $a'$, the hub being strengthened, preferably, by a rib, $a^2$, extended from it outwardly to the periphery of the disk $a$, which latter, at its periphery, to secure greatest strength with the least weight of material, is also provided with a rib or lip, $a^3$, the said lips $a^2$ and $a^3$ being preferably continuous and formed by casting. The slide $b$, having the segmental or semi-cylindrical hub $b'$, to co-operate with the hub or part $a'$ and constitute a two-part hub to firmly embrace the beam A, is adapted to slide in the space between the ribs $a^2$ $a^2$, the disk $a$ being cut away at 10 and 12 (see Fig. 3) to receive projections 13 and 14, extended from the rear side of the plate $b$, to be described, the projection 14 constituting a bridging projection having, as herein shown, a point, 3.

The upper part (see Fig. 3) of the central hole, 20, in the disk $a$ is made of a greater circle than the lower part having the point 2, or the said hole 20 is elongated or not truly circular, such construction enabling the head $a$ to be readily moved or adjusted on the beam when the plate $b$ is loosened, as will be described.

When the head has been moved into proper position, the segmental hub $b'$ will be forced inwardly by the adjusting device or screw $d$ until the said segmental hub and the segmental hub $a'$ grasp between them closely the circular periphery of the said beam, the bridging projection 14 at such time resting with its lower edge below the edge of the hole or opening 20 in the head $a$, and resting against the beam A, thus preventing the warp-threads from entering the space 15, (see Fig. 3,) which is left between the inner edge of the hole 20 in the head $a$ and the concaved lower end of the plate $b$, at its junction with the flange $b'$.

The flange $a'$ of the head $a$ is shown as provided at its interior with a prong, 2, to enter the beam, and with short concaved bearings 16, to act against the periphery of the beam and afford a rigid seat for the head notwithstanding irregularities at the periphery of the beam.

The outer end of the radially-movable plate $b$ is acted upon by an adjusting device, $d$, (shown as a screw extended through an ear, $d'$, and acting upon the end of the plate $b$,) rotation of the adjusting device in one direction causing the plate $b$ to be forced toward the axis of the beam A, such movement of the plate causing the segmental or separable parts $a'$ $b'$ of the hub to be forced snugly against and to embrace closely the said beam, the points or projections 2 3 (see Figs. 1 and 2) at such time entering the beam.

When the screw is moved in the direction to permit the two-part hub to be separated, in order that the warp-beam head may be removed from the beam or be adjusted to a different position, it is desirable to provide means whereby the segmental parts of the hub may be normally kept separated far enough to permit the head to be moved longitudinally on the beam without the points 2 3 interfering therewith. To accomplish this I have herein shown the plate $b$ as provided with a projection, 5, (see Fig. 1,) which enters a groove made in the disk $a$ back of the said plate, a spiral spring, 6, being interposed between the bottom of the said groove and the under side of the said lip, the spring acting normally when its pressure is not overcome by the adjusting device $d$ to keep the upper side of the lip 5 against the shoulder 8, constituting a part of the disk $a$ and located at the outer end of the groove which receives the spring.

To enable the adjusting device $d$ to be rapidly turned, its head has been made square to receive a handle or crank, $e$. (Shown by dotted lines.)

To prevent the lateral movement of the plate $b$ out from between the ribs $a^2$ $a^2$, I have provided the ends of the segmental hub $b'$ (see Fig. 4) with prongs 24, one at each side, which prongs enter pockets or spaces 25 (see Fig. 1) formed in or at the ends of the segmental part of the hub $a'$.

The plate $b$, at its rear side, near its upper end, is provided with a lug, 13, having shoulders at its side, which enter behind lips 26, (see Fig. 5,) formed near the junction of the ribs $a^2$ with the body of the head $a$.

When the plate $b$ is to be applied to the head $a$ the screw $d$ is turned nearly out from the ear $d'$, so that the lug 13 may enter the space 10 between the ribs $a^2$, the outer end of said space being large enough to permit the entrance of the said lug 13. After the lug 13 has been passed into the outer end of the hole 10 so that the rear side of the said lug is flush with the back of the head, the plate $b$ is moved toward the center of the head, such movement causing the lug to slide behind the lips 26, and at the same time the prongs 24 enter the pockets 25, and thus placed in position the screw $d$ is turned in far enough to keep the lug 13 in engagement with some part of the lips 26, and in this condition the plate $b$, by any lateral movement of the head $a$, cannot be pushed or pulled laterally out from between the ribs $a^2$.

I claim—

1. A warp-beam head composed of a disk having an attached segmental hub provided with pockets 25 and a separate movable plate, $b$, having a permanently-attached segmental hub, $b'$, provided with projections 24, to enter the said pocket, combined with means to hold the plate $b$ in position, substantially as described.

2. The slotted head or disk $a$, having a segmental hub, $a'$, integral therewith, and lips 26, to constitute guides, and the independent plate $b$, having a segmental hub, $b'$, and projections 13 14, combined with adjusting devices, substantially as described, to force the said plate $b$ toward the center of the disk $a$, as set forth.

3. The warp-beam head $a$, having the elongated or oval opening, and a segmental hub, $a'$, combined with a radially-movable slide having a segmental hub provided with a projection, 14, to enter the space 15 left between the inner edge of the enlarged or oval opening of the head and the inner side of the segmental hub $b'$, to operate substantially as described.

4. The warp-beam head having an opening the edge of which is provided with short concaved bearings 16 and a segmental hub, $a'$, combined with the plate $b$ having the hub $b'$, and with means to hold the plate $b$ in position to grasp the beam between it and the hub $a'$, substantially as described.

5. The beam-head $a$, having a segmental hub, $a'$, pockets 25, opening 10, and lips 26, combined with the sliding plate $b$, having prongs 24, and a shouldered lug, the prongs entering the said pockets, the said lug engaging the lips, and with means to hold the said plate in position to grasp the beam between it and the hub $a'$, all substantially as described.

In testimony whereof I have signed my name to this specification in the presence of two subscribing witnesses.

ELIHU P. COLLINS.

Witnesses:
GEO. W. GREGORY,
C. M. CONE.